(12) United States Patent
Yang et al.

(10) Patent No.: US 11,332,134 B2
(45) Date of Patent: May 17, 2022

(54) PREDICTING LANE CHANGES OF OTHER VEHICLES

(71) Applicant: Robert Bosch GmbH, Stuttgart (DE)

(72) Inventors: Chun Yang, Budapest (HU); Laszlo Anka, Heilbronn (DE); Adam Rigo, Budapest (HU); Kornel Istvan Kis, Tapolca (HU); Levente Kis, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/715,572

(22) Filed: Dec. 16, 2019

(65) Prior Publication Data

US 2020/0189581 A1 Jun. 18, 2020

(30) Foreign Application Priority Data

Dec. 18, 2018 (DE) ...................... 10 2018 222 176.6

(51) Int. Cl.
*B60W 30/095* (2012.01)
*B60W 50/14* (2020.01)

(52) U.S. Cl.
CPC ........ *B60W 30/0956* (2013.01); *B60W 50/14* (2013.01); *B60W 2050/143* (2013.01);
(Continued)

(58) Field of Classification Search
CPC ............. B60W 30/0956; B60W 50/14; B60W 2554/804; B60W 2555/20;
(Continued)

(56) References Cited

U.S. PATENT DOCUMENTS

| | | | | |
|---|---|---|---|---|
| 8,903,588 | B2* | 12/2014 | Schmudderich | ... G06K 9/00798 701/23 |
| 2015/0186926 | A1* | 7/2015 | Chittilappilly | ..... G06Q 30/0242 705/14.42 |

(Continued)

FOREIGN PATENT DOCUMENTS

| | | |
|---|---|---|
| DE | 102006049264 A1 | 4/2008 |
| DE | 102016106983 A1 | 10/2017 |

(Continued)

*Primary Examiner* — Jelani A Smith
*Assistant Examiner* — Frank T Glenn, III
(74) *Attorney, Agent, or Firm* — Norton Rose Fulbright US LLP; Gerard Messina

(57) ABSTRACT

A method for predicting whether another vehicle in the driving-environment of an ego-vehicle will execute a lane-change, based on observations of the driving-environment of the ego-vehicle, including: the observations are supplied to individual classificators; based on at least a portion of the observations, each individual classificator, in accordance with an individual instruction, ascertains an individual probability that the other vehicle will change lanes; the driving situation in which the ego-vehicle finds itself is classified as a whole by a situation classificator into one of several discrete classes; a record of weighting factors, assigned to the class into which the situation-classificator has classified the driving-situation, is ascertained, that indicates the relative weighting of the individual classificators for this driving situation; the individual probabilities are set off against the weighting-factors to form an overall probability that the other vehicle will change lanes. A method for training weighting-factors and related computer-program are described.

15 Claims, 3 Drawing Sheets

(52) U.S. Cl.
CPC ... *B60W 2050/146* (2013.01); *B60W 2552/05* (2020.02); *B60W 2554/4045* (2020.02); *B60W 2554/804* (2020.02); *B60W 2555/20* (2020.02)

(58) Field of Classification Search
CPC ..... B60W 2552/05; B60W 2554/4045; B60W 2050/143; B60W 2050/146
See application file for complete search history.

(56) References Cited

U.S. PATENT DOCUMENTS

| | | | |
|---|---|---|---|
| 2017/0021812 A1* | 1/2017 | Sugano | B60W 40/08 |
| 2017/0166123 A1* | 6/2017 | Bahgat | B60W 30/0956 |
| 2018/0114133 A1* | 4/2018 | Chowdhary | G06F 1/3296 |
| 2019/0164007 A1* | 5/2019 | Liu | G06K 9/0063 |
| 2019/0382018 A1* | 12/2019 | Garnault | B60W 60/00272 |
| 2020/0117194 A1* | 4/2020 | Gu | G05D 1/0221 |
| 2020/0117200 A1* | 4/2020 | Akella | G05D 1/0223 |
| 2020/0143233 A1* | 5/2020 | Ando | G06N 3/084 |
| 2021/0070320 A1* | 3/2021 | Nagaraja | B60W 60/0013 |

FOREIGN PATENT DOCUMENTS

| | | |
|---|---|---|
| DE | 102016009762 A1 | 2/2018 |
| DE | 102017117158 A1 | 2/2018 |

* cited by examiner

PREDICTING LANE CHANGES OF OTHER VEHICLES

FIELD OF THE INVENTION

The present invention relates to a method for use in a driver assistance system of an ego vehicle and/or in an ego vehicle driving at least partially in an automated manner, with which it is possible to predict lane changes of other vehicles.

BACKGROUND INFORMATION

Guiding a vehicle in road traffic is not the same as guiding the vehicle through a course of static and uniformly moving obstacles. Rather, it is also necessary to react to sudden actions of other road users which alter their state of motion. For example, if, by changing lanes, another vehicle enters into the safety distance currently maintained to the preceding vehicle, then the necessary safety distance to this new preceding vehicle no longer exists, and must be actively reestablished. A lane change by another vehicle which is initiated simultaneously with a driving maneuver by the ego vehicle may also lead to a collision if neither of the parties knew of the maneuver planned by the other party. That is why overall, approximately 18% of all accidents are caused by errors while changing lanes.

In addition to human drivers, driver assistance systems which are intended to facilitate the driving task must also pay attention to lane changes by other vehicles. It is therefore advantageous if such a system is already able to predict such lane changes before they are actually initiated. For example, a device for detecting the swinging into and out of lanes for a driver assistance system is known from DE 10 2006 049 264 A1.

SUMMARY OF THE INVENTION

Within the framework of the present invention, a method has been developed for predicting whether another vehicle in the driving environment of an ego vehicle will execute a lane change, based on observations of the driving environment of the ego vehicle.

The ego vehicle is that vehicle which may be influenced directly with the aid of the results attained by the method such as, e.g., by intervention into a system regarding driving dynamics or by actuating a horn.

The observation may be of any type. For instance, the driving environment of the ego vehicle, or at least a portion of it, may be covered with a camera, with lidar, with radar or with another sensor system. However, information about the presence of the other vehicle and/or about its intentions may also be obtained, for example, via a radio interface such as, e.g., via V2V (Vehicle to Vehicle) communication or V2I (Vehicle to Infrastructure) communication.

In the method, the observations are supplied to a plurality of individual classificators. Based on at least a portion of the observations, each individual classificator, in accordance with an individual instruction, ascertains an individual probability that the other vehicle will change lanes.

In particular, the individual classificators may include what are referred to as "weak learners", thus, may contain instructions according to which, given the presence of certain conditions, a justifiably increased probability argues for a lane change by the other vehicle, without such a lane change already being able to be predicted with certainty.

For example, one individual classificator may thus ascertain whether a turn-signal indicator of the other vehicle is activated. According to highway traffic regulations, the turn-signal indicator must be used when changing lanes, but not only then. For instance, if the signposting signals a branching-off of a priority road, then the turn-signal indicator must signal precisely that the driver would like to follow the branching-off priority road, that is, would like to remain in his present traffic lane. In addition, when tailgating on the freeway, the left turn-signal indicator is often set, even though a lane change to the left is not possible at the moment because of the lack of a further traffic lane. The signal is thus used in a way in which it wasn't intended to be used, in order to ask the preceding vehicle to create a free pathway. The flashing of the turn-signal indicator is therefore not a sufficient condition for an upcoming lane change. It is not even a necessary condition in practice, because the actuation required per se is often forgotten.

For example, one individual classificator may also ascertain whether the other vehicle is matching its speed in the lane currently used by the other vehicle, to a driving speed in a lane adjacent to it. Such a maneuver makes sense, in order to make optimal use of a small gap in the traffic in the adjacent lane for swinging in. However, there may also be other reasons for matching speed. For instance, traffic both in the lane currently being used by the other vehicle, as well as in the adjacent lane may react simultaneously to a change in the speed limit.

For example, one individual classificator may also ascertain whether the lane presently being used by the other vehicle is blocked and/or ends up ahead of the other vehicle. In this case, the other vehicle must change lanes in order to be able to continue its travel. It is also actually required that according to the traffic zipper method, the lane change must not take place until immediately before the obstruction, thus, it is required to continue to use the current lane until the obstruction is reached. In reality, the lane change is often made into the first gap offering itself, long before the obstruction, because of the unfounded fear that there will be no opportunity later.

In addition, the driving situation in which the ego vehicle finds itself is classified as a whole by a situation classificator into one of several discrete classes. A record of weighting factors, assigned to the class into which the situation classificator has classified the driving situation, is ascertained that indicates the relative weighting of the individual classificators for this driving situation. The individual probabilities are set off against the weighting factors to form an overall probability that the other vehicle will change lanes.

For example, the driving situation may be classified based at least on the category of the road presently being used by the ego vehicle. Thus, different rules for overtaking are in effect on a superhighway, for instance, than on a country road, where the abstract possibility that a fast vehicle is approaching from the area currently not visible in the lane of oncoming traffic, forbids overtaking in many situations. Conversely, within closed communities, a traffic lane may be selected freely that is, overtaking on the right is allowed.

The driving situation may also be classified, e.g., based at least on the visibility conditions and/or based on the lighting conditions in the driving environment of the ego vehicle. For example, some individual classificators may thus be based on monitoring which functions better in the daylight than at night. It then makes sense to weight such individual classificators higher in the daytime than at night.

The driving situation may also be classified, for example, based on the type of traffic junction toward which the ego vehicle is heading. Thus, for instance, a traffic crossing ahead may represent a motivation for another vehicle to change lanes in order to get into a lane for a certain direction of travel. On the other hand, this is not necessary in the case of a rotary intersection, since there the driving direction is first selected upon exiting from the rotary.

In particular, the ascertainment of the weighting factors may include calling up these weighting factors from a table or database which assigns a record of weighting factors to each class of driving situations. Specifically, this table or database may be the result of a previous training. Such a training may be based, e.g., on training data records of observations for which in each case the "ground truth" is available as to whether or not a lane change by another vehicle takes place in the specific situation after the moment of the observation.

It was recognized that by setting off the probabilities supplied by a plurality of individual classificators to form one overall probability for a lane change, the reliability of this overall probability may be increased considerably. As explained previously based on examples, a single indication such as an activated turn-signal indicator, for instance, is not yet sufficient for a reliable prediction. However, if several indications such as, for instance, the turn-signal indicator and the matching of the speed come together, then an intention to change lanes remains as the only logical reason for this behavior of the other vehicle.

Moreover, in this way, the complex behavior analysis of the other vehicle may be broken down into subproblems which are able to be solved independently of each other. The complexity is therefore reduced to manageable units ("divide and rule"). Thus, for example, the detection of an activated turn-signal indicator may be optimized without the detection of a matching of speed thereby inadvertently suffering.

In particular, the separate classification of the driving situation as a whole by the situation classificator also contributes to this in synergistic manner. The possibility of shifting the weights of the individual classificators in a manner adapted to the situation obviates the necessity of the individual classificators having to deal with all driving situations. For example, if the lane markings must be evaluated in order to ascertain the lane changes currently allowed, then a first individual classificator may be optimized for detecting these lane markings for dry weather and a second individual classificator may be optimized for detecting the same lane markings in wet weather.

The maximally flexible assembling of several "weak learners" to form one "strong learner", which furnishes a reliable prediction with respect to intended lane changes, first of all improves the reliability of the overall probability. Secondly, the computation effort is reduced considerably, since the subproblems into which the overall task is broken down are each solvable very efficiently.

For instance, the individual classificators may be Bayes networks or classificators concluding based on the case. The weighting factors specific to the respective driving situation may be trained, e.g., with the adaptive boosting (AdaBoost) algorithm or with a gradient tree algorithm.

In one especially advantageous refinement, if the ascertained record of weighting factors includes at least one weighting factor that is zero or lies below a predetermined threshold value, in response, the individual classificator belonging to this weighting factor is disregarded when ascertaining the overall probability. First of all, in this way it is possible to counteract the tendency that a judgment made by the individual classificators relevant in a present driving situation (for instance, situation 1) will be watered down by an abundant number of individual classificators currently not relevant because intended for other driving situations (for instance, situations 2-50). Secondly, the evaluation of the overall probability may also be accelerated, since the computation effort for the evaluation of the non-relevant individual classificators is eliminated In one further, particularly advantageous development, in addition, at least one sensor for the driving environment of the ego vehicle is deactivated if the observations of this sensor are used exclusively by those individual classificators which are not taken into account in ascertaining the overall probability. In this way, first of all, energy for the operation of this sensor may be saved. Secondly, bandwidth for the transmission of the observations within the vehicle may also be conserved. Thus, for example, a camera optimized for operation in daylight, in the dark supplies only noise which contains no usable information and is also particularly difficult to compress for the data transmission. Bandwidth is a scarce resource in a vehicle; a high-speed CAN bus transmits a maximum of 1 MBit/s. In addition, conserving of bandwidth helps in being able to evaluate the overall probability more quickly. Correspondingly, the reaction to a possible lane change by an another vehicle may also be initiated earlier. For example, the deactivation may be effectuated by switching off the power supply or the network communication of the sensor.

In one especially advantageous refinement, if the ascertained overall probability exceeds a predetermined threshold value and the anticipated trajectory of the other vehicle intersects the presently planned trajectory of the ego vehicle as a result of the questionable lane change, in response, an optical and/or acoustic warning device of the ego vehicle is activated and/or a drive system, a brake system and/or a steering system of the ego vehicle is/are controlled in order to prevent the trajectories from intersecting.

For instance, the warning device may prompt the driver of the ego vehicle to refrain from a driving maneuver intended on his part or to take other countermeasures. However, the warning device may also be a horn, for example, which warns the driver of the other vehicle not to carry out the intended lane change. It is possible that the ego vehicle has become "hidden" in the blind spot of the other vehicle, and therefore was not perceived.

For example, the required confidence with which the overall probability is determined may be made dependent, e.g., upon how drastic the measure is which is planned for the case when the threshold value is exceeded. Thus, it is annoying, but not necessarily dangerous, if the horn of the ego vehicle is actuated as a result of a false alarm. On the other hand, an emergency braking without motivation, which comes as a complete surprise for the following traffic, may cause a rear-end collision.

The prediction method is carried out advantageously on board the ego vehicle, but is not limited to that. For instance, it may also be made available completely or in part as a cloud service. In particular, the weighting factors may come from an external source. A system which implements the method may be furnished from the factory with an initial supply of weighting factors, for example, which is enlarged and/or updated via a network connection during later operation of the vehicle.

For example, the prediction method may be utilized in a driver assistance system (Advanced Driver Assistance System, ADAS), in an intelligent cruise control (Adaptive Cruise Control, ACC), in a predictive automatic emergency braking system (Predictive Emergency Braking System/

Automatic Emergency Braking, AEB), in a turning assistant or in a system for completely or partially automated driving.

The present invention also relates to a method for ascertaining the weighting factors. This method works with training data records of observations which relate in each case to similar driving situations, i.e., to those driving situations which are assigned to the same class by the situation classificator. A quantity of observations is provided in each training data record. These observations may be made up of instantaneous observations at a specific point of time ("present point of time"), and/or a time characteristic of observations over a period of time preceding this "present point of time." In addition, it is known in each instance whether another vehicle will execute a lane change after the "present point of time."

In the method, the weighting factors are optimized, with the goal being that after the individual probabilities have been set off against the weighting factors to form the overall probability on average over the predetermined quantity of training data records of observations, the error in predicting whether another vehicle will execute a lane change is minimized.

For example, for each training data record, the individual probabilities of the individual classificators may be evaluated on the basis of the observations contained in the training data record and set off against a candidate record of weighting factors to form one overall probability, with which a lane change by the other vehicle is predicted on the basis of the training data record in question. This overall probability may then be compared to the known training information as to whether after the "present point of time", a lane change actually takes place, and the corresponding error may be assessed. If, on the basis of the known training information, a lane change takes place, then the ascertained overall probability should be as great as possible. If, on the other hand, on the basis of the known training information, no lane change takes place, then the ascertained overall probability should be as small as possible.

The average deviation of the ascertained overall probability from in each case "true" value 1 (with certainty lane change) or −1 (with certainty no lane change) over all training data records represents, for example, an average value, a median or a sum formed over all training data records, which is then a measure for how well the candidate record of weighting factors in the specific driving situation couples the individual classificators ("weak learners") to form one meaningful overall classificator ("strong learner").

Further altered candidate records of weighting factors may then be tested according to any given optimization method, until a minimal error over all training data records is reached. For example, if the search space has only a small dimensionality, it may be scanned according to a brute force method. Any given gradient descent method may also be used, for instance.

When the optimization for one class of driving situations is completed, it may begin anew for the next class. That is, those training data records are then taken up which relate to driving situations of the ego vehicle that are assigned by the situation classifier to the next class. Accordingly, the result of this optimization is used during later operation of the method precisely when a driving situation from this class is present. The total required optimization of the weighting factors over all driving situations may thus be split up again according to the principle "divide and rule" into manageable work packages that are independent of each other. In other words, when the next work package is started, the results of earlier work packages are not affected.

In one particularly advantageous refinement, the optimization is carried out iteratively, and upon each iteration, an additional individual probability will be taken into account in comparison to the previous iteration. Thus, rather than searching through the complete multidimensional space of the available weighting factors immediately, the dimensionality of the task may be increased stepwise, and therefore a quicker convergence may possibly be attained. For example, the iterative optimization may be carried out using the AdaBoost algorithm.

In this context, in each iteration, the training data records may be weighted especially advantageously among each other according to the error in the prediction occurring in the previous iteration. In this way, the optimization may be concentrated particularly on a more accurate assessment of the training data records for which the greatest error occurs. Thus, individual classifiers which are suitable for a more accurate analysis of these training data records are then specifically selected.

The data record of weighting factors obtained by the optimization may be used in an existing system that has individual classificators and is installed for predicting lane changes, in order to improve the accuracy with which the probability for a lane change by another vehicle is able to be predicted, utilizing these individual classificators. The data record is therefore an independent product with customer benefit. That is why the present invention also relates to a data record of weighting factors for use in the prediction method described, which was obtained according to the ascertainment method described.

Both the prediction method and the ascertainment method may be implemented completely or partially in software. For example, this software may be used to upgrade an existing control unit for a driver assistance system or for at least partially automated driving, and consequently is likewise an independent product with customer benefit. Therefore, the present invention also relates to a computer program having machine-readable instructions which, when executed on a computer and/or in a control unit, prompt the computer and/or the control unit to carry out the method for prediction or the method for ascertainment. The invention likewise relates to a machine-readable data carrier or a download product with the computer program.

Furthermore, a control unit, especially a control unit for a vehicle, is claimed which is equipped to carry out one of the methods described above.

Further measures improving the invention are presented in greater detail below together with the description of the exemplary embodiments of the invention with the aid of figures.

DETAILED DESCRIPTION

Figure 1:
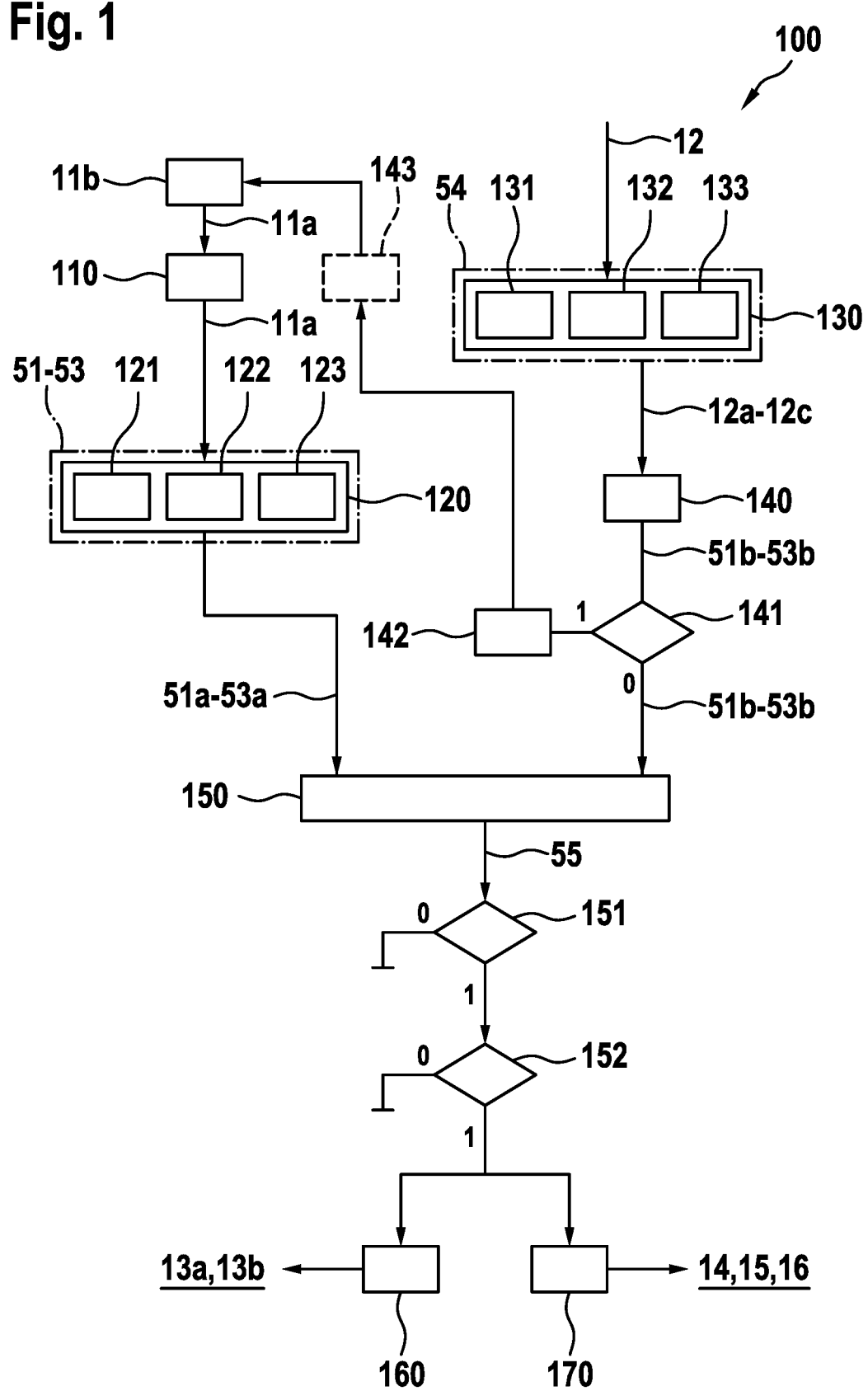
FIG. 1 shows an exemplary flowchart of method 100 for the prediction.

According to FIG. 1, in step 110 of method 100, observations 11$a$ from driving environment 11 of ego vehicle 1 are fed to a plurality of individual classificators 51-53.

Observations 11a may be picked up by sensors, for example, of which one sensor 11b is drawn in by way of example in FIG. 1.

In step 120, each individual classifier 51-53 ascertains its own individual probability 51a-53a that another vehicle 2 will execute a lane change. In this context, probability 51a-53a may lie on the customary scale between 0 and 1, but also on an expanded scale between −1 and 1, for example. In the latter case, the plus/minus sign indicates whether "no lane change" (negative) or "lane change" (positive) is predicted, while at the same time, the amount indicates the specific confidence. For example, it is possible to ascertain whether a turn-signal indicator of other vehicle 2 is activated (block 121), whether other vehicle 2 is matching its speed in the lane currently used by other vehicle 2, to the driving speed in a lane adjacent to it (block 122), and/or whether the lane currently used by other vehicle 2 is blocked and/or ends up ahead of other vehicle 2 (block 123).

In addition, in step 130, driving situation 12 in which ego vehicle 1 finds itself is classified as a whole by a situation classifier 54 into one of several classes 12a-12c. For example, the classification may be carried out based on the category of the road currently used by ego vehicle 1 (block 131), and/or based on the visibility conditions and/or based on the lighting conditions in driving environment 11 of ego vehicle 1 (block 132), and/or based on the type of traffic junction toward which ego vehicle 1 is heading (block 133).

The classification of driving situation 12 carried out in step 130 is utilized in step 140 to ascertain a record of matching weighting factors 51b-53b for individual classifiers 51-53, that is, for individual probabilities 51a-53a supplied by these individual classifiers 51-53, as well.

In the example shown in FIG. 1, each of weighting factors 51b-53b is first of all checked in step 141 as to whether it is zero or lies below a predetermined threshold value. If this is not the case (truth value 0), weighting factor 51b-53b in question enters into the determination of overall probability 55 in step 150. However, if weighting factor 51b-53b is zero or lies below the threshold value (truth value 1 in step 141), according to step 142, associated individual classifier 51-53, and consequently also individual probability 51b-53b supplied by this individual classifier 51-53, is disregarded in determining overall probability 55 in step 150. In addition, as an option, a sensor 11b, whose observations 11a are used exclusively by individual classifiers 51-53 disregarded according to step 142, may be deactivated in step 143

In step 150, individual probabilities 51a-53a supplied by individual classifiers 51-53 are set off against associated weighting factors 51b-53b to form an overall probability 55 that another vehicle 2 is executing a lane change. This overall probability 55 may be used subsequently to avoid a collision between ego vehicle 1 and other vehicle 2.

In step 151, it is first checked whether ascertained overall probability 55 exceeds a predetermined threshold value. If this is the case (truth value 1), it is next checked in step 152 whether anticipated trajectory 2a of other vehicle 2 intersects currently planned trajectory 1a of ego vehicle 1. If this is the case (truth value 1), then measures may be taken to avoid a collision. The sequence of checks in steps 151 and 152 may also be interchanged.

According to step 160, as a countermeasure, it is considered, for example, to activate a physical warning device 13a perceivable by the driver of ego vehicle 1, and/or to activate a horn 13b perceivable for the driver of other vehicle 2. Furthermore, according to step 170, it is considered, for example, to control a drive system 14, a brake system 15 and/or a steering system 16 of ego vehicle 1 in order to alter trajectory 1a of ego vehicle 1 in such a way that it is no longer intersected by anticipated trajectory 2a of other vehicle 2. Since trajectories 1a and 2a determine the positions of vehicles 1 and 2, respectively, in space and time, a non-intersection of these trajectories 1a and 2a means that vehicles 1 and 2 are not at the same location at the same time, that is, a collision is avoided.

Figure 2:
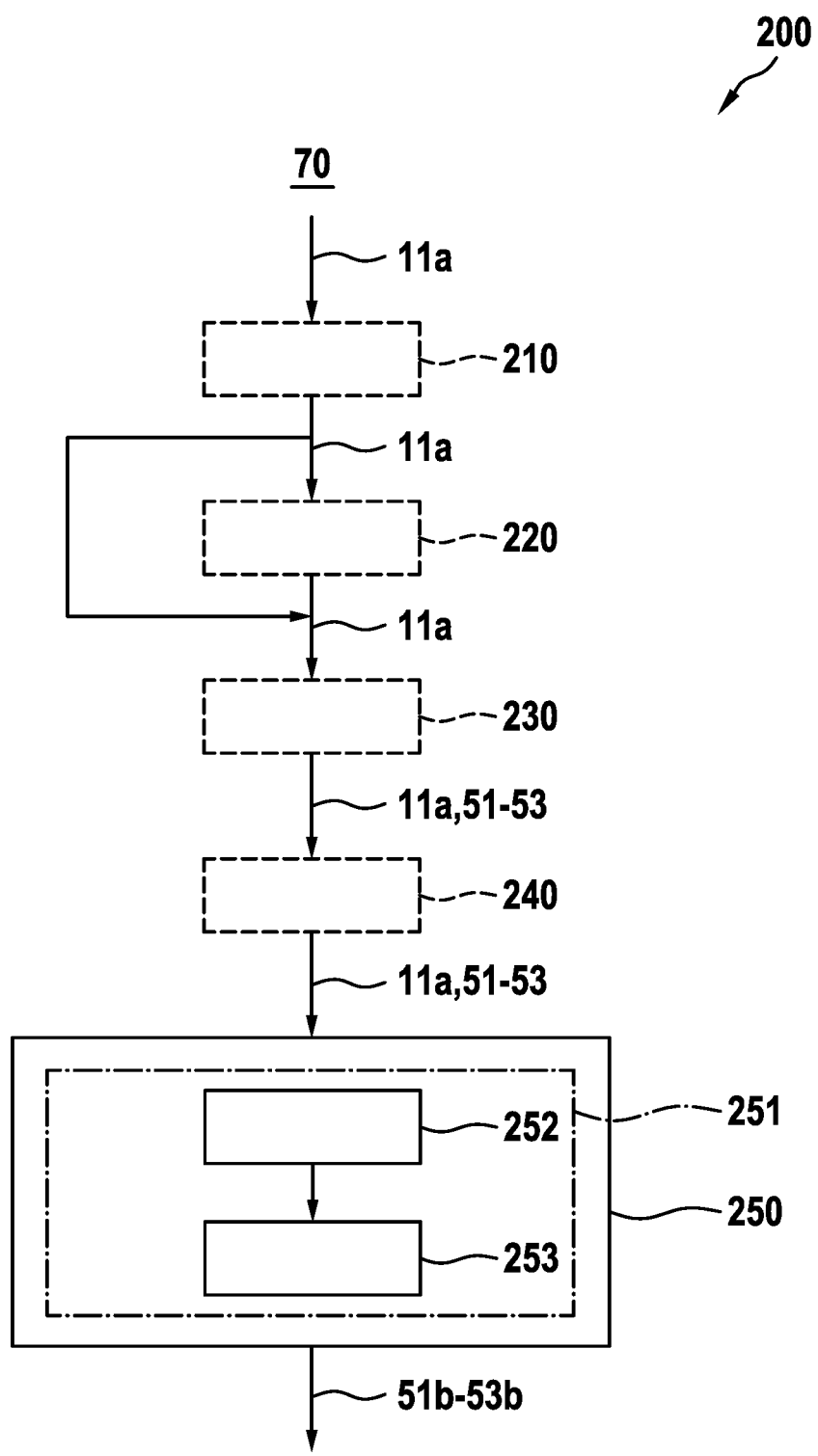
FIG. 2 shows an exemplary flowchart of method 200 for ascertaining weighting factors 51$b$-53$b$.

FIG. 2 shows an exemplary embodiment of method 200, with which weighting factors 51b-53b may be trained for use in method 100. Method 200 assumes that a quantity of training data records 70 having observations 11a are available, in each case it being known in advance whether these observations 11a are also followed in each instance by a lane change of another vehicle 2.

In optional step 210, observations 11a are prepared and preprocessed. According to optional step 220, in addition, features may be extracted for individual classifiers 51-53. According to optional step 230, candidates for individual classifiers 51-53 may be trained and their performances assessed. According to optional step 240, final individual classifiers 51-53 may be selected on the basis of this assessment.

In step 250, weighting factors 51b-53b are finally trained, in doing so, it being assumed that a record of individual classifiers 51-53 was already determined. This record of individual classifiers 51-53 may have been obtained according to steps 230 and 240 shown in FIG. 2, but also in any other way.

According to block 251, the optimization is carried out iteratively. In so doing, according to block 252, upon each iteration an additional individual probability 51a-53a is taken into account in comparison to the previous iteration. According to block 253, in each iteration, training data records 70 are weighted among each other in accordance with the error occurring in the previous iteration. In the case of the first iteration, for example, all training data records 70 may be weighted equally.

Weighting factors 51b-53b ascertained at the end of optimization 250 may be utilized in driving situations 12 of the class 12a-12c to which training data records 70 relate, in order to weight individual classifiers 51-53.

Figure 3:
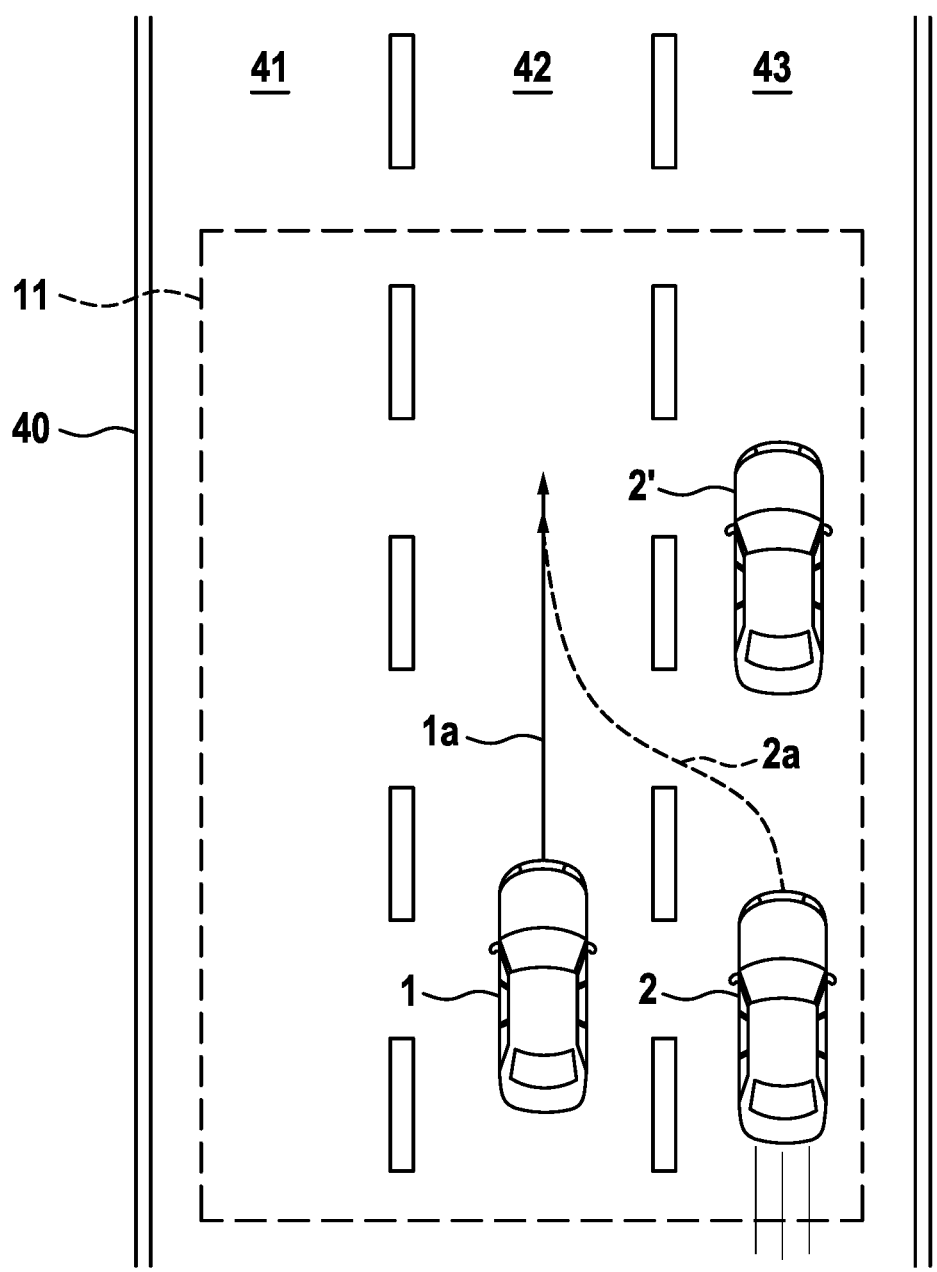
FIG. 3 shows an exemplary driving situation 3 in which prediction method 100 may be used.

FIG. 3 shows an exemplary driving situation 12 in which method 100 for predicting lane changes is usable. In the example shown in FIG. 3, class 12a-12c into which situation classifier 54 categorizes driving situation 12 is geared toward whether the travel is taking place in daylight (class 12a), at night (class 12b) or in rainy weather (class 12c).

Ego vehicle 1 is traveling on a three-lane road 40 in center lane 42 of three lanes 41, 42, 43. A slow other vehicle 2' is traveling in right lane 43 and a fast other vehicle 2 is approaching from behind. Ego vehicle 1 is monitoring its driving environment 11 with a sensor system not shown in detail.

For example, using method 100, it is now possible, on the basis of the speed of fast other vehicle 2 in conjunction with the presence of slow other vehicle 2', to predict a high probability that other vehicle 2 will overtake ego vehicle 1 illegally on the right and cut in in front of ego vehicle 1 in its lane 42. If this happens, anticipated trajectory 2a of other vehicle 2 will intersect presently planned trajectory 1a of ego vehicle 1. As a result, ego vehicle 1 may take countermeasures.

What is claimed is:

1. A method for predicting whether an other vehicle in the driving environment of an ego vehicle will execute a lane change, based on observations of the driving environment of the ego vehicle, the method comprising:
   supplying the observations to a plurality of individual classificators;
   ascertaining, based on at least a portion of the observations, each individual classificator, in accordance with an individual instruction, an individual probability that the other vehicle will change lanes;
   classifying the driving situation in which the ego vehicle finds itself as a whole by a situation classificator into one of several discrete classes;
   ascertaining a record of weighting factors, assigned to the class into which the situation classificator has classified the driving situation, that indicates the relative weighting of the individual classificators for this driving situation; and
   setting off the individual probabilities against the weighting factors to form an overall probability that the other vehicle will change lanes;
   wherein the weighting factors are optimized to the effect that after setting off individual probabilities against the weighting factors to form an overall probability on average over a predetermined quantity of training data records of observations, an error in predicting whether another vehicle will execute a lane change is minimized, it being known in each instance with respect to the training data records whether the other vehicle will actually execute a lane change, and the training data records relating to driving situations of the ego vehicle which are assigned by a situation classificator to a same class,
   wherein the weighting factors specific to a respective driving situation are trained with an adaptive boosting algorithm or with a gradient tree algorithm,
   wherein the optimization is carried out iteratively to provide an iterative optimization, and upon each iteration, an additional individual probability is taken into account in comparison to a previous iteration, so as to provide a quicker convergence, and
   wherein the iterative optimization is carried out using the adaptive boosting algorithm.

2. The method of claim 1, wherein the driving situation is classified based at least on the category of the road on which the ego vehicle is currently traveling.

3. The method of claim 1, wherein the driving situation is classified based at least on visibility conditions and/or based on lighting conditions in the driving environment of the ego vehicle.

4. The method of claim 1, wherein the driving situation is classified based at least on the type of traffic junction toward which the ego vehicle is heading.

5. The method of claim 1, wherein if the ascertained record of weighting factors includes at least one weighting factor that is zero or lies below a predetermined threshold value, in response, an individual classificator belonging to a corresponding weighting factor is disregarded in ascertaining the overall probability.

6. The method of claim 5, wherein at least one sensor for the driving environment of the ego vehicle, whose observations are used exclusively by ones of the individual classificators which are disregarded in ascertaining the overall probability, is deactivated.

7. The method of claim 1, wherein at least one individual classificator ascertains whether a turn-signal indicator of the other vehicle is activated.

8. The method of claim 1, wherein at least one individual classificator ascertains whether the other vehicle is matching its speed in a lane currently used by the other vehicle, to a driving speed in a lane adjacent to the other vehicle.

9. The method of claim 1, wherein at least one individual classificator ascertains whether a lane presently being used by the other vehicle is blocked and/or ends up ahead of the other vehicle.

10. The method of claim 1, wherein when the ascertained overall probability exceeds a predetermined threshold value and an anticipated trajectory of the other vehicle intersects a presently planned trajectory of the ego vehicle as a result of a questionable lane change, in response, an optical and/or acoustic warning device of the ego vehicle is activated and/or a drive system, a brake system and/or a steering system of the ego vehicle is/are controlled in order to prevent the trajectories from intersecting.

11. A method for ascertaining weighting factors for use in predicting whether an other vehicle in the driving environment of an ego vehicle will execute a lane change, based on observations of the driving environment of the ego vehicle, the method comprising:
   optimizing the weighting factors to the effect that after setting off individual probabilities against the weighting factors to form an overall probability on average over a predetermined quantity of training data records of observations, an error in predicting whether another vehicle will execute a lane change is minimized, it being known in each instance with respect to the training data records whether the other vehicle will actually execute a lane change, and the training data records relating to driving situations of the ego vehicle which are assigned by a situation classificator to a same class;
   supplying the observations to a plurality of individual classificators;
   ascertaining, based on at least a portion of the observations, each individual classificator, in accordance with an individual instruction, an individual probability that the other vehicle will change lanes;
   classifying a driving situation in which the ego vehicle finds itself as a whole by a situation classificator into one of several discrete classes;
   ascertaining a record of the weighting factors, assigned to the class into which the situation classificator has classified the driving situation, that indicates the relative weighting of the individual classificators for this driving situation; and
   setting off the individual probabilities against the weighting factors to form an overall probability that the other vehicle will change lanes;
   wherein the weighting factors specific to a respective driving situation are trained with an adaptive boosting algorithm or with a gradient tree algorithm,
   wherein the optimization is carried out iteratively to provide an iterative optimization, and upon each iteration, an additional individual probability is taken into account in comparison to a previous iteration, so as to provide a quicker convergence, and
   wherein the iterative optimization is carried out using the adaptive boosting algorithm.

12. The method of claim 11, wherein the optimization is carried out iteratively, and upon each iteration, an additional individual probability is taken into account in comparison to a previous iteration.

13. The method of claim 12, wherein in each iteration, the training data records are weighted among each other according to an error in the prediction occurring in the previous iteration.

14. The method of claim 12, wherein the driving situation is classified based at least on the category of the road on which the ego vehicle is currently traveling.

15. A non-transitory computer readable medium having a computer program, which is executable by a processor, comprising:
- a program code arrangement having program code for predicting whether an other vehicle in a driving environment of an ego vehicle will execute a lane change, based on observations of the driving environment of the ego vehicle, by performing the following:
  - supplying the observations to a plurality of individual classificators;
  - ascertaining, based on at least a portion of the observations, each individual classificator, in accordance with an individual instruction, an individual probability that the other vehicle will change lanes;
  - classifying a driving situation in which the ego vehicle finds itself as a whole by a situation classificator into one of several discrete classes;
  - ascertaining a record of weighting factors, assigned to the class into which the situation classificator has classified the driving situation, that indicates a relative weighting of the individual classificators for this driving situation; and
  - setting off the individual probabilities against the weighting factors to form an overall probability that the other vehicle will change lanes;
- wherein the weighting factors are optimized to the effect that after setting off individual probabilities against the weighting factors to form an overall probability on average over a predetermined quantity of training data records of observations, an error in predicting whether another vehicle will execute a lane change is minimized, it being known in each instance with respect to the training data records whether the other vehicle will actually execute a lane change, and the training data records relating to driving situations of the ego vehicle which are assigned by a situation classificator to a same class,
- wherein the weighting factors specific to a respective driving situation are trained with an adaptive boosting algorithm or with a gradient tree algorithm,
- wherein the optimization is carried out iteratively to provide an iterative optimization, and upon each iteration, an additional individual probability is taken into account in comparison to a previous iteration, so as to provide a quicker convergence, and
- wherein the iterative optimization is carried out using the adaptive boosting algorithm.

* * * * *